(No Model.)
W. B. QUIGLEY.
CAR BRAKE.
No. 268,726. Patented Dec. 5, 1882.
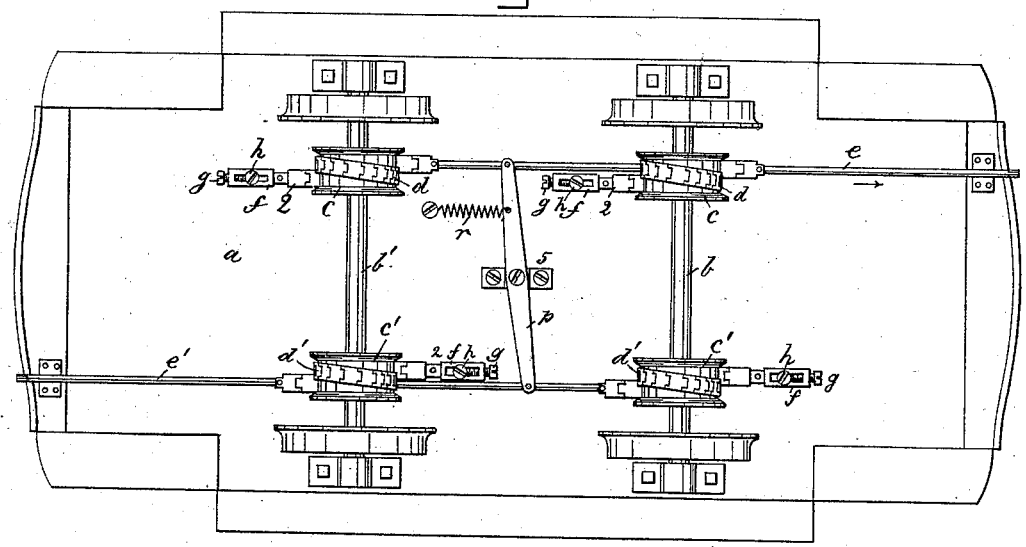
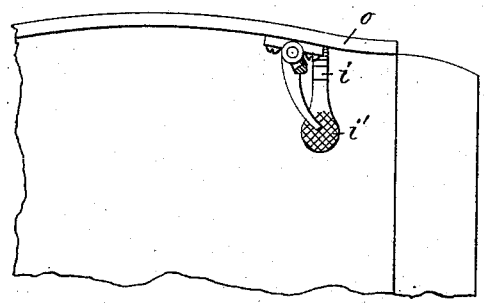
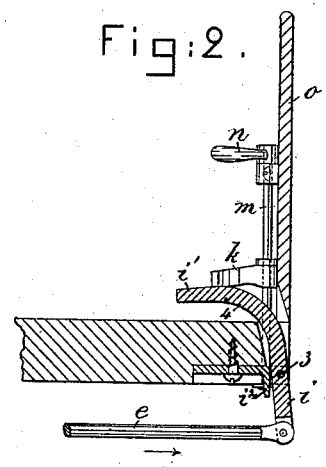
Witnesses
Fred N. Powell
John F. C. Brunlist
Inventor
William B. Quigley
by Crosby & Gregory attys

UNITED STATES PATENT OFFICE.

WILLIAM B. QUIGLEY, OF BOSTON, MASSACHUSETTS.

CAR-BRAKE.

SPECIFICATION forming part of Letters Patent No. 268,726, dated December 5, 1882.

Application filed September 26, 1882. (No model.)

*To all whom it may concern:*

Be it known that I, WILLIAM B. QUIGLEY, of Boston, county of Suffolk, and State of Massachusetts, have invented an Improvement in Car-Brakes, of which the following description, in connection with the accompanying drawings, is a specification.

My invention relates to a car-brake, and is especially intended for use upon horse-cars, it having for its object to provide a brake that can be readily operated by the foot of the driver, thus leaving both hands free to manage the horses. The brake is applied by means of a bent lever, having one arm arranged to be acted upon by the foot of the driver standing on the platform, and its other arm connected with the rod by which the brake is applied directly to the wheels. The brake itself consists of a flexible band or chain wound wholly around a friction-drum fixed to the axles of the wheels in such a manner that the friction between the drum and chain tends to assist the action of the brake-lever in tightening the chain. As herein shown, both axles are provided with drums and co-operating chains connected with a single rod extending to the end of a car and connected with the brake-actuating lever, and when the car is intended to run in both directions the said brake mechanism is duplicated at the two ends of the car.

The invention also consists in the combination, with the brake-actuating lever, of a locking device, by which the brake may be retained applied to the wheels when the driver leaves the car, it also being arranged to enable the brake to be applied by power of the hand instead of the foot, if desired.

Figure 1 is an under side view of a car having braking mechanism embodying this invention; Fig. 2, a longitudinal section of a portion thereof, showing the brake-actuating lever and its locking device; and Fig. 3, a plan view of the parts shown in Fig. 2.

The car $a$ is of the construction usually employed for street-cars, it having two axles, $b\ b'$, with connected pairs of wheels. The said axles $b\ b'$ are provided with friction-drums $c\ c'$, having flexible friction devices, shown as chains $d\ d'$, encircling them, and attached at one end, as 2, to the car-body, and at their other end to rods $e\ e'$, one running to each end of the car. It will be seen that by moving the rod $e$ in the direction of the arrow, Fig. 1, when the car is moving in the same direction the chains $d$ will be tightened on the drums $c$, and that the friction produced between the said chains and drums tends to still further tighten the chains, thus causing them to act with a very powerful friction to resist the rotation of the wheels and axles. The said chains are connected at 2 with sliding pieces $f$, having adjusting-screws $g$ to bear against studs $h$, that are fixed to the car-body. The said ends of the chain may be adjusted to cause the tension derived from the movement of the rod $e$ to be about equally divided between the said chains. The rod $e$ is thus moved to apply the brakes by means of a bent lever, $i$, pivoted at 3 upon the platform of the car, it being shown as having one arm curved at 4 into a substantially horizontal position, and provided with a foot-piece, $i'$, to receive the pressure of the foot of the driver, the said foot-piece being shown in Fig. 2 as depressed and the brakes applied. In order to retain the said brakes applied without keeping the foot upon the foot-piece $i'$, a locking device is provided, consisting of an arm, $k$, fixed upon a shaft, $m$, provided with a handle, $n$, the said arm being adapted to engage the upper part of a treadle, $i$, and retain it in its depressed position, as shown in Figs. 2 and 3. When the brakes are not applied the shaft $m$ is rotated, so that the arm $k$ and handle $n$ lie against the dash-board $o$ of the car-platform, and the curvature at 4 of the lever $i$ is such that by forcibly rotating the shaft $m$ by means of the handle $n$ the arm $k$ engages the said curved portion, and will depress the treadle $i'$ of the lever and apply the brake. As shown in Fig. 1, the drums $c$, with their chains $d$ and the connected parts, are operated from one end of the car, while the drums $c'$, with their chains $d'$, are operated by precisely similar apparatus at the other end of the car.

The rods $e\ e'$ are shown as connected by a retracting-lever, $p$, pivoted at 5, and acted upon by a spring, $r$, tending to draw back the rods $e\ e'$ in the opposite direction to that in which they are moved by the brake-actuating levers in applying the brake, so as to thus retain the chains slack and inoperative except when the brake is positively applied.

It is obvious that a single one of the drums $c$ and chains $d$ might be employed, thus applying the braking power only to one axle from either end of the car.

The shoulder $i^2$ limits the backward movement of the lever $i$ when it arrives at its normal position.

I claim—

1. The combination of the friction device of a car-brake with the actuating-lever, having one arm curved and provided with a foot-piece, and the locking-arm, its shaft and handle co-operating with the said lever, substantially as described.

2. The combination, with two parallel axles provided with friction-drums, of the flexible friction devices wound around the said drums in the same direction, and each independently connected at one end to the car and at the other end with actuating mechanism common to them, substantially as described.

3. The combination, with the axle provided with a friction-drum, of the flexible friction device wound around the said drum, and the actuating-lever having one arm connected with the said friction device and its other arm provided with a foot-piece, substantially as described.

4. The combination, with the axles and drums thereon, of the flexible friction devices wound around the said drums, a rod and actuating mechanism common to both the said devices, and means for adjusting the said devices independently, whereby the actuating force may be properly divided between them, substantially as described.

In testimony whereof I have signed my name to this specification in the presence of two subscribing witnesses.

WILLIAM B. QUIGLEY.

Witnesses:
   Jos. P. Livermore,
   Bernice J. Noyes.